(12) United States Patent
Chen

(10) Patent No.: US 7,393,166 B2
(45) Date of Patent: Jul. 1, 2008

(54) CHUCK IN A PROCESSING MACHINE

(76) Inventor: Chin-Chiu Chen, No. 198, Jungpu Rd., Cingshuei Chen, Taichung Hsien (TW)

( * ) Notice: Subject to any disclaimer, the term of this patent is extended or adjusted under 35 U.S.C. 154(b) by 9 days.

(21) Appl. No.: 11/499,675

(22) Filed: Aug. 7, 2006

(65) Prior Publication Data

US 2008/0031699 A1 Feb. 7, 2008

(51) Int. Cl.
*B23Q 3/12* (2006.01)
(52) U.S. Cl. ...................................... 409/234
(58) Field of Classification Search ................ 409/232, 409/234, 141; 408/143, 239 A
See application file for complete search history.

(56) References Cited

U.S. PATENT DOCUMENTS

| | | | |
|---|---|---|---|
| 5,975,816 A * | 11/1999 | Cook | 409/131 |
| 6,071,219 A * | 6/2000 | Cook | 483/1 |
| 6,109,842 A * | 8/2000 | Cook | 409/131 |
| 6,231,282 B1 * | 5/2001 | Yoneyama et al. | 409/234 |
| 6,382,888 B2 * | 5/2002 | Cook | 409/141 |
| 2005/0214087 A1 * | 9/2005 | Agapiou et al. | 409/141 |
| 2007/0098512 A1 * | 5/2007 | Chen | 409/234 |
| 2007/0098513 A1 * | 5/2007 | Chen | 409/234 |

FOREIGN PATENT DOCUMENTS

| | | | |
|---|---|---|---|
| GB | 2123720 A | * | 2/1984 |
| JP | 09094727 A | * | 4/1997 |
| JP | 2000326168 A | * | 11/2000 |
| JP | 2001009657 A | * | 1/2001 |
| JP | 2001246508 A | * | 9/2001 |

* cited by examiner

*Primary Examiner*—Daniel W Howell
(74) *Attorney, Agent, or Firm*—Rabin & Berdo, P.C.

(57) ABSTRACT

In a chuck adapted for connection to a processing machine and composed of a connecting portion adapted to extend into the processing machine so as to securely engage the processing machine, a head adapted for holding a blade, and a flange sandwiched between the head and the connecting portion thereby/defining a gap between the flange and a bottom face of the processing machine, the improvement including: a shoulder formed on a top face of the flange portion; an annular pad supported on the shoulder of the flange portion and adapted to be mounted around the connecting portion; and a secondary annular pad mounted on and supported by the shoulder of the flange portion, and sandwiched between the shoulder and the annular pad, whereby the gap between the flange portion and a bottom face of the processing machine is compensated for by existence of the annular pad.

19 Claims, 10 Drawing Sheets

CHUCK IN A PROCESSING MACHINE

BACKGROUND OF THE INVENTION

1. Field of the Invention

The present invention relates to a chuck, and more particularly to a chuck in a processing machine capable of securing the blade during the processing procedure without the worry of vibration and friction wear to the parts of the chuck.

2. Description of the Related Art

A processing machine or a lathe is used to work on an object to produce a requited item. During the processing procedure, normally a processing blade is the key to the work. Despite the sharpness issue of the blade, there is something that deserves attention. That is, during the process, if the chuck for holding the processing blade is not firmly secured to the processing machine, vibration between the chuck and the processing machine causes bad processing work. Also, the processing procedure is not smooth.

In order to have a better understanding of the conventional problem, reference is made to FIG. 10, in which, a conventional chuck (50) is connected to a processing machine (60). The chuck (50) is composed of a connection portion (51) and a head portion (52) in connection with the connection portion (51) via a flange portion (53) which is integrally formed with both the connection portion (51) and the head portion (52). The connection portion (51) has a conical cross section and the dimension of the flange portion (53) is larger than the dimension of the bottom most of the connection portion (51). The processing machine (60) is provided with a conical indentation (61) corresponding to the conical connection portion (51) of the chuck (50) so that the connection portion (51) is able to be received inside the conical indentation (61) of the processing machine (60).

It is noted that a gap (A) exists between a bottom face (62) of the processing machine (60) and a top face of the flange portion (53). Due to the existence of the gap (A), vibration of different levels often cause bad precision in the processing procedure. Furthermore, friction between the outer periphery of the connection portion (51) and an inner periphery of the conical indentation (61) causes wear to the chuck (50), which deteriorates the connection between the chuck (50) and the processing machine (60).

To overcome these shortcomings, the present invention intends to provide an improved chuck to mitigate the aforementioned problems.

The primary objective of the present invention is to provide an improved chuck to mitigate vibration between the chuck and the processing machine such that high precision is maintained during the processing procedure.

SUMMARY OF THE INVENTION

In order to accomplish the aforementioned objective, the chuck of the present invention includes a conical connecting portion, a head and a flange portion sandwiched between the connecting portion and the head. The head has a circular cross section and the flange portion has a dimension larger than a dimension of a bottom most face of the connecting portion. A shoulder is formed on a top face of the flange portion. An annular pad is provided on top of the shoulder of the flange portion. Due to the thickness of the annular pad, the gap between the chuck and the processing machine is compensated. Because the gap between the flange portion and the bottom face of the processing machine is filled with the annular pad, engagement between the chuck and the processing machine is secured. Thus vibration and friction are obviated.

Other objects, advantages and novel features of the invention will become more apparent from the following detailed description when taken in conjunction with the accompanying drawings.

DETAILED DESCRIPTION OF THE INVENTION

Figure 1:
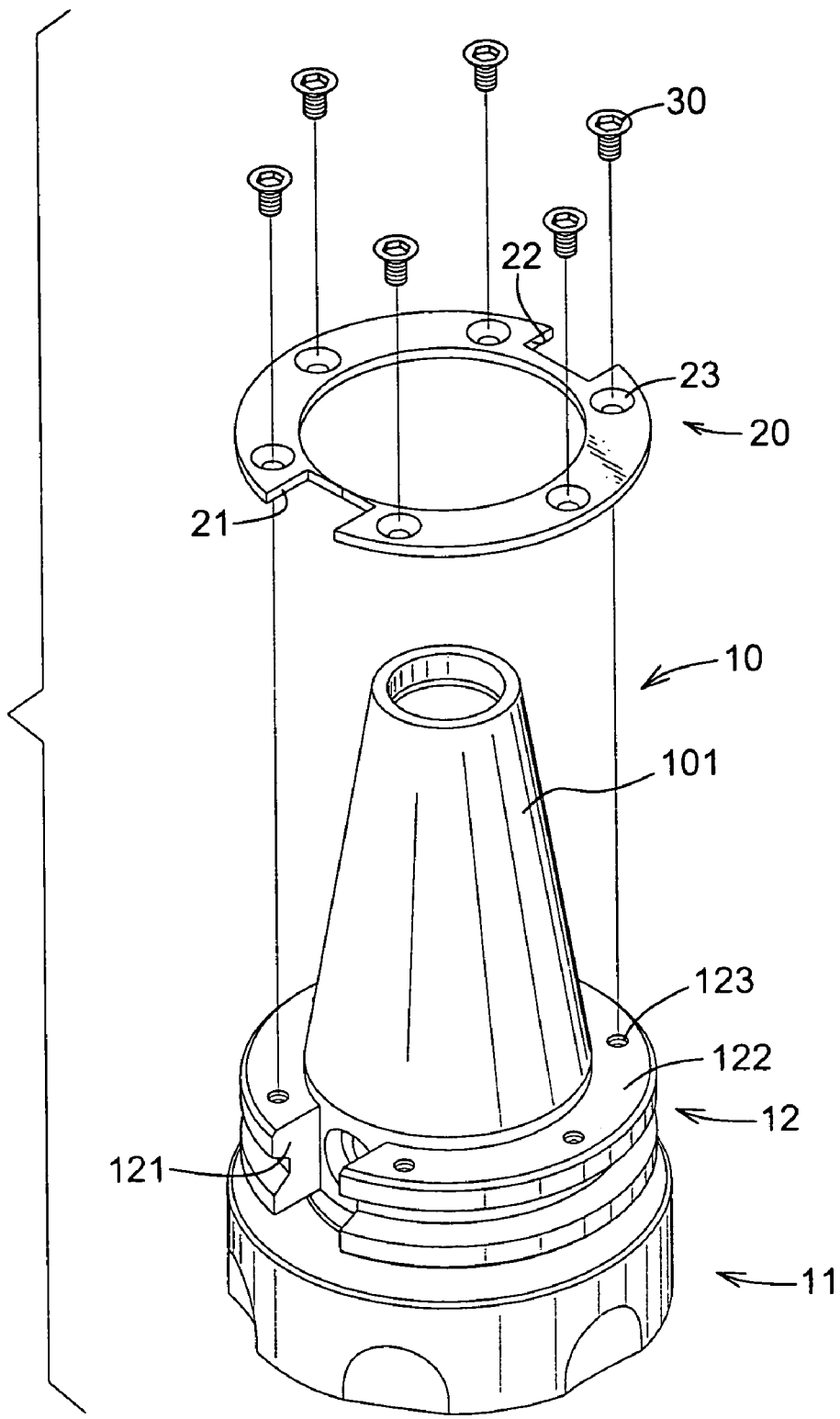
FIG. 1 is an exploded perspective view of the chuck of the present invention.

With reference to FIG. 1, it is noted that the chuck (10) in accordance with the present invention includes a conical connecting portion (101), a head (11), and a flange portion (12) sandwiched between the head (11) and the conical connecting portion (10). The head (11) is configured to hold a blade (not shown) and the flange portion (12) is provided with a cutout (121) defined in a side face thereof. A shoulder (122) is formed on a top face of the flange portion (12) and multiple threaded holes (123) (six are shown) are defined in a face of the shoulder (122). An annular pad (20) is mounted around the connecting portion (101) and provided with a first cutout (21) corresponding to the cutout (121) of the flange portion (12), a second cutout (22) opposite to the first cutout (21) and multiple countersunk holes (23) defined through the annular pad (20) and having a quantity substantially the same as that of the threaded holes (123) of the flange portion (12). Multiple threaded bolts (30) are provided to extend through the countersunk holes (23) and into the threaded holes (123) of the flange portion (12).

Figure 2:
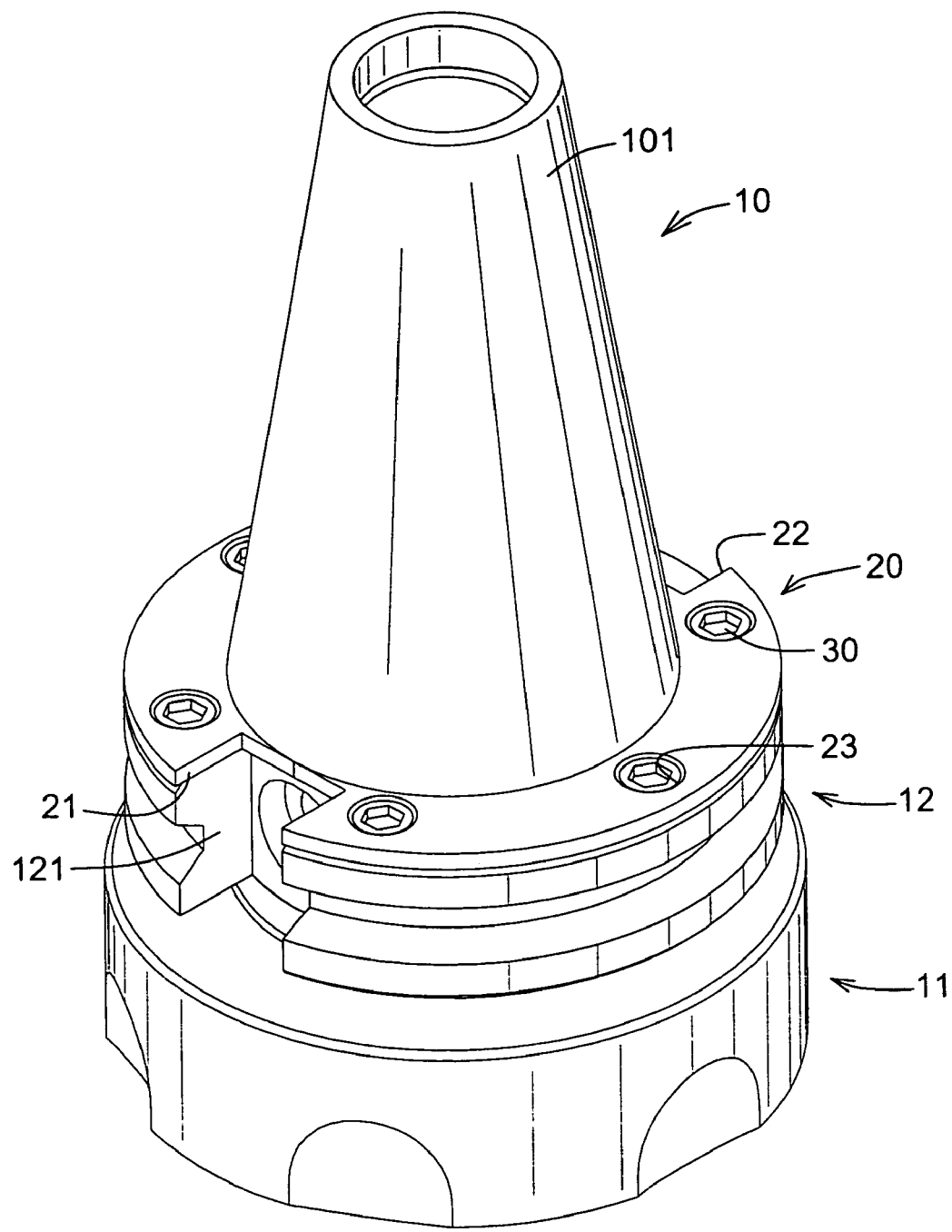
FIG. 2 is a perspective view showing that the annular pad is mounted on and supported by the flange portion of the chuck.
Figure 3:
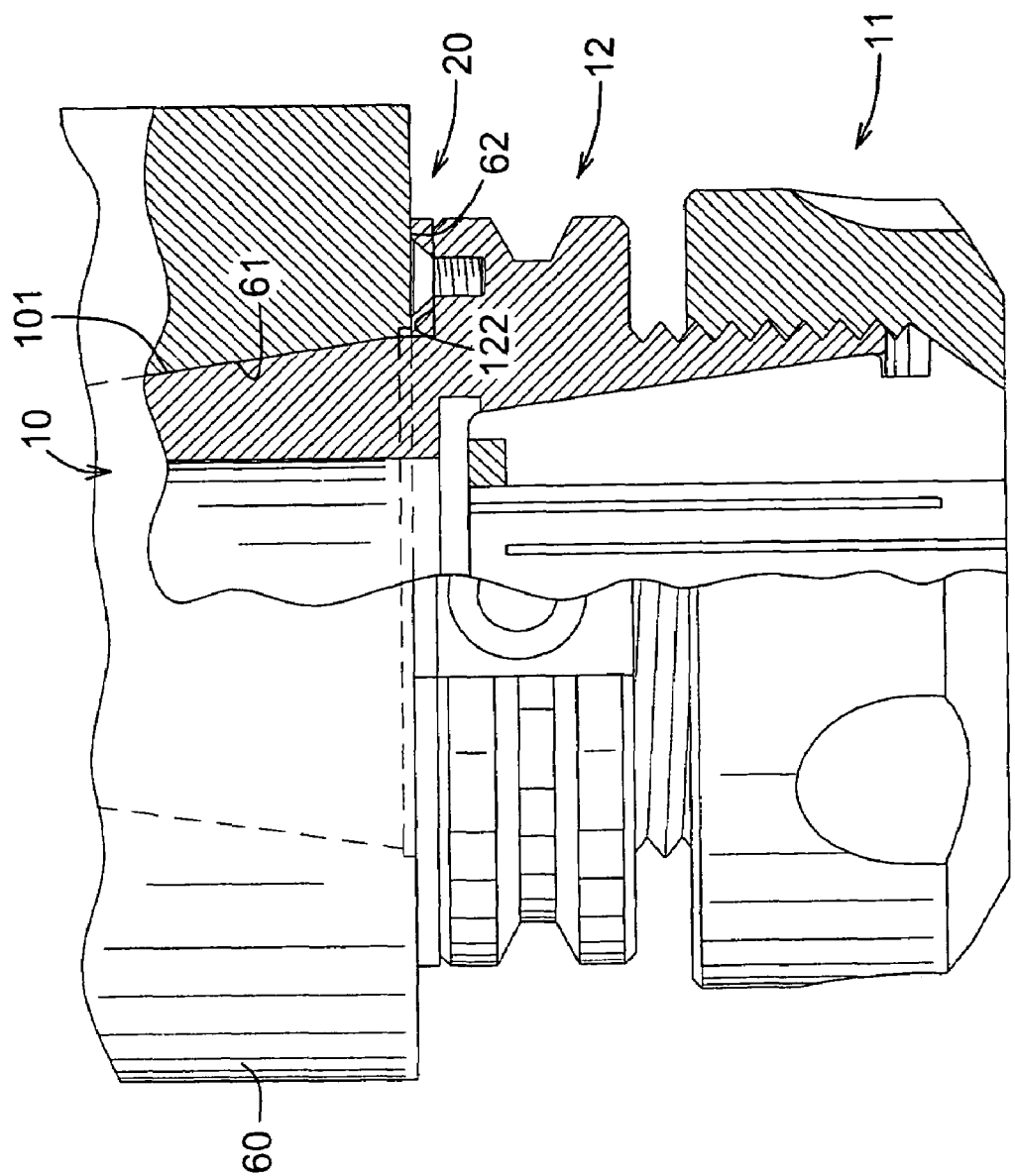
FIG. 3 is a schematic cross section showing that the existence of the annular pad between the chuck of the present invention and a processing machine obviates the possibility of vibration and friction of the connecting portion of the chuck.

With reference to FIGS. 2 and 3, it is noted that, after the annular pad (20) is securely mounted on top of the shoulder (122) via the threaded bolts (30) and the chuck (10) is connected to a processing machine (60) via extension of the connecting portion (101) into a conical hole (61) in the processing machine (60), due to the thickness of the annular pad (20), the chuck (10) is securely engaged with a bottom face (62) of the processing machine (60), which obviates the possibility of friction and vibration between the processing machine (60) and the chuck (10). Thus, processing precision is maintained.

Figure 4:
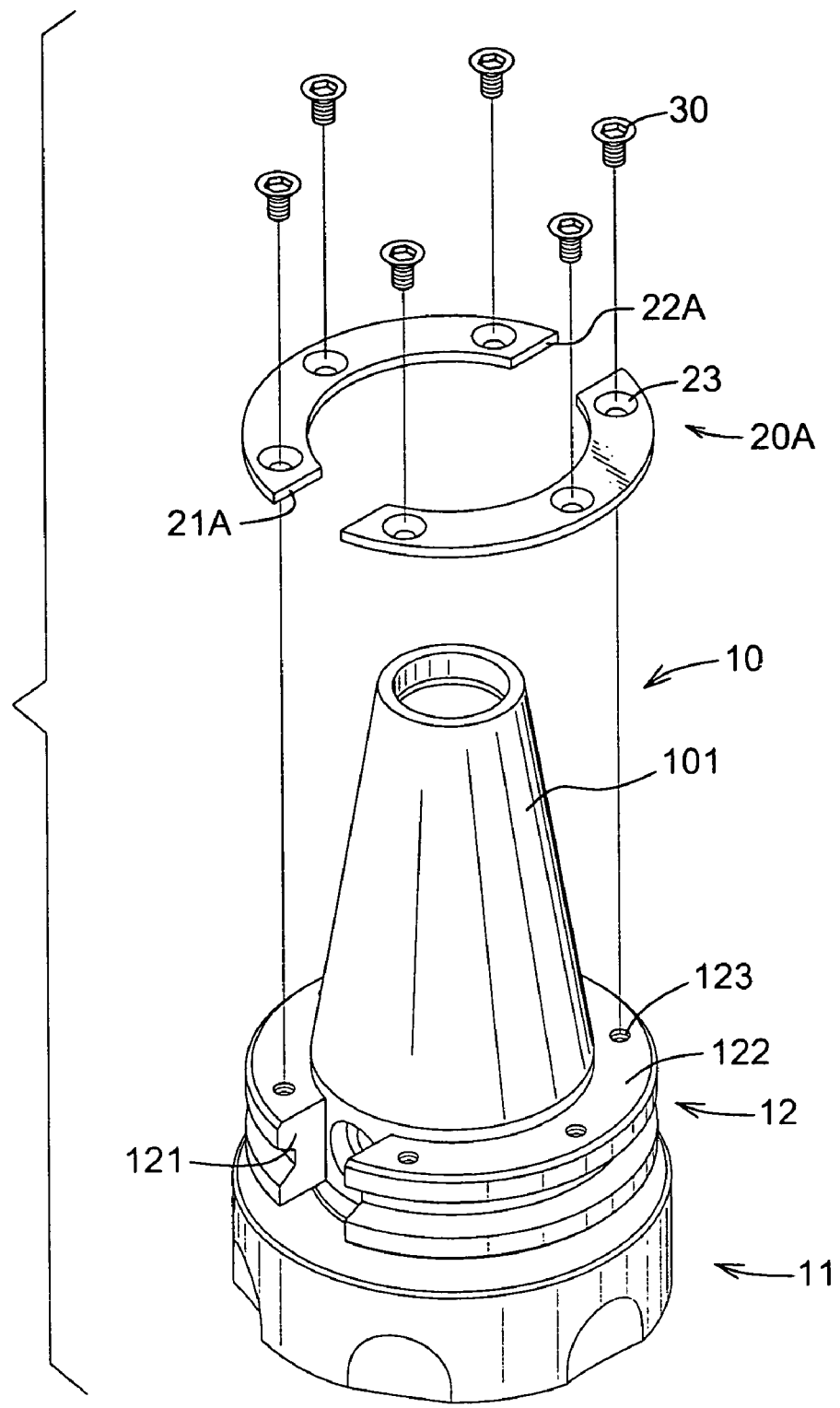
FIG. 4 is an exploded perspective view showing a different embodiment of the annular pad.

With reference to FIG. 4, it is noted that annular pad (20A) may be formed to be sectioned. That is, the annular pad (20A) is composed of two halves and can still accomplish the designated objective. To accomplish this configuration of the annular pad (20A), it is noted from the accompanying drawing that the annular pad (20A) now has a first through hole (21A) and a second through hole (22A) longitudinally defined in the annular pad (20A) to literally separate the annular pad (20A) into halves.

Figure 5:
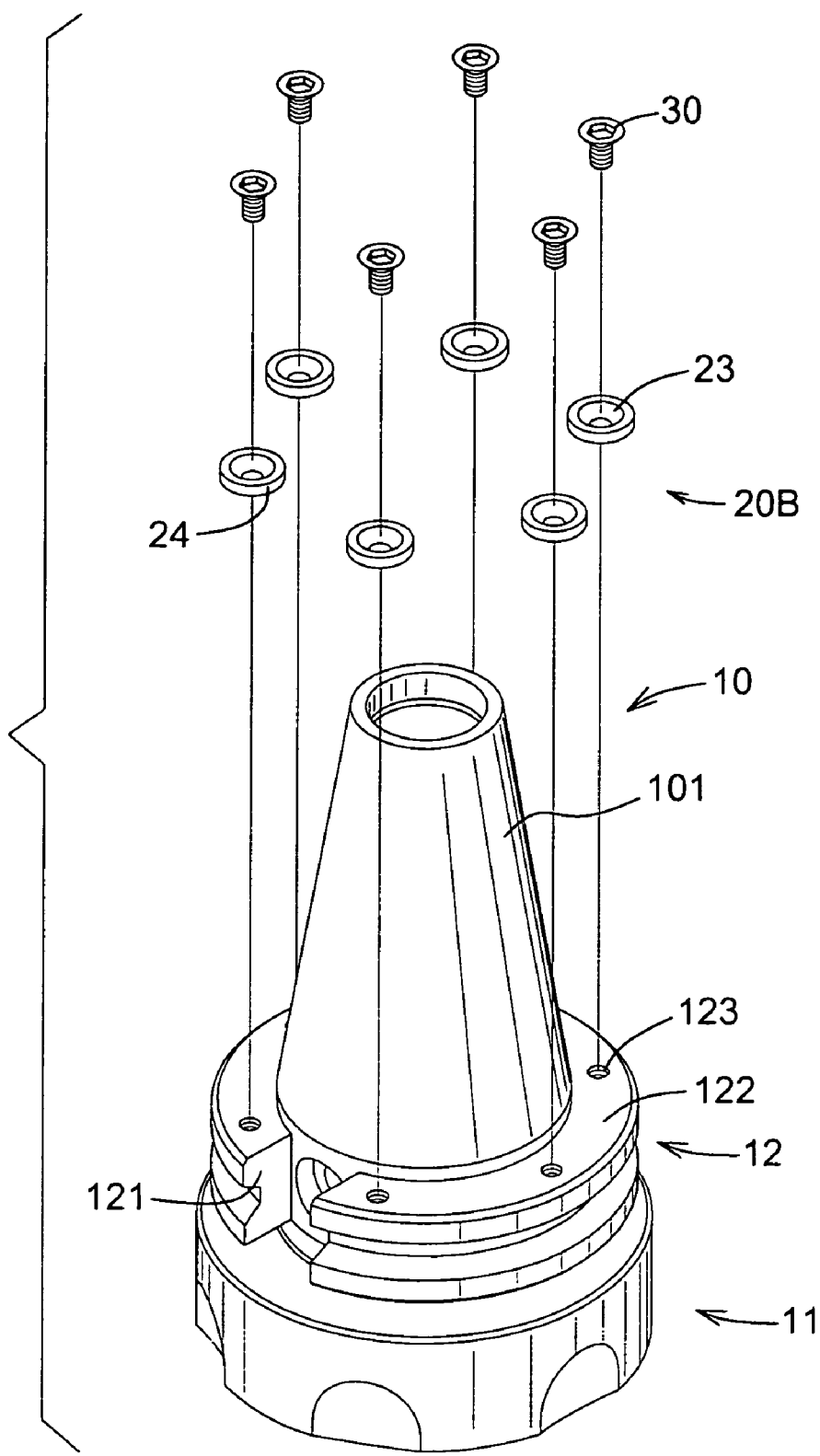
FIG. 5 is an exploded perspective view showing a still different embodiment of the annular pad.

With reference to FIG. 5, it is noted that annular pad (20B) has six through holes (24) longitudinally defined to literally separate the annular pad (20B) into six sections and can still accomplish the designated objective.

Figure 6:
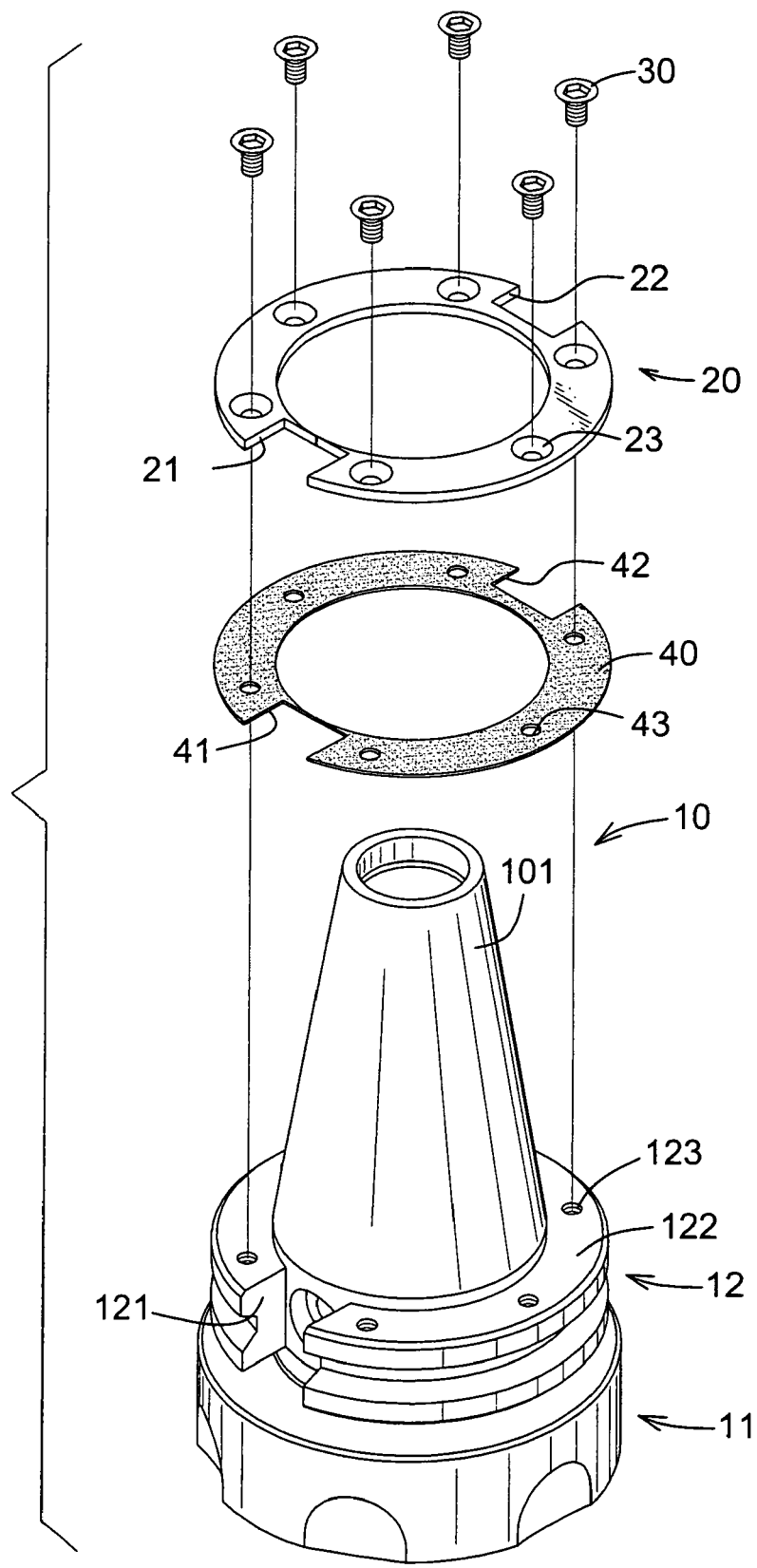
FIG. 6 is an exploded perspective view showing a secondary annular pad supported by the shoulder of the flange portion of the present invention.

With reference to FIG. 6, it is noted that the chuck (10) is substantially the same as that disclosed in the previous drawings except that there is provision of a secondary annular pad (40). The secondary annular pad (40) has a dimension and configuration substantially the same as those of the annular pad (20). However, there is a thickness difference between the annular pad (20) and the secondary annular pad (40) (the secondary annular pad (40) is thinner than that of the annular pad (20)).

Accordingly, the secondary annular pad (40) is provided with a third cutout (41) to correspond to the cutout (121) of the flange portion (12) and the first cutout (21) of the annular pad (20) and a fourth cutout (42) to correspond to the second cutout (22) of the annular pad (20). Multiple apertures (43) are defined to correspond to the countersunk holes (23) of the annular pad (20) and the threaded holes (123) of the flange portion (12).

Figure 7:
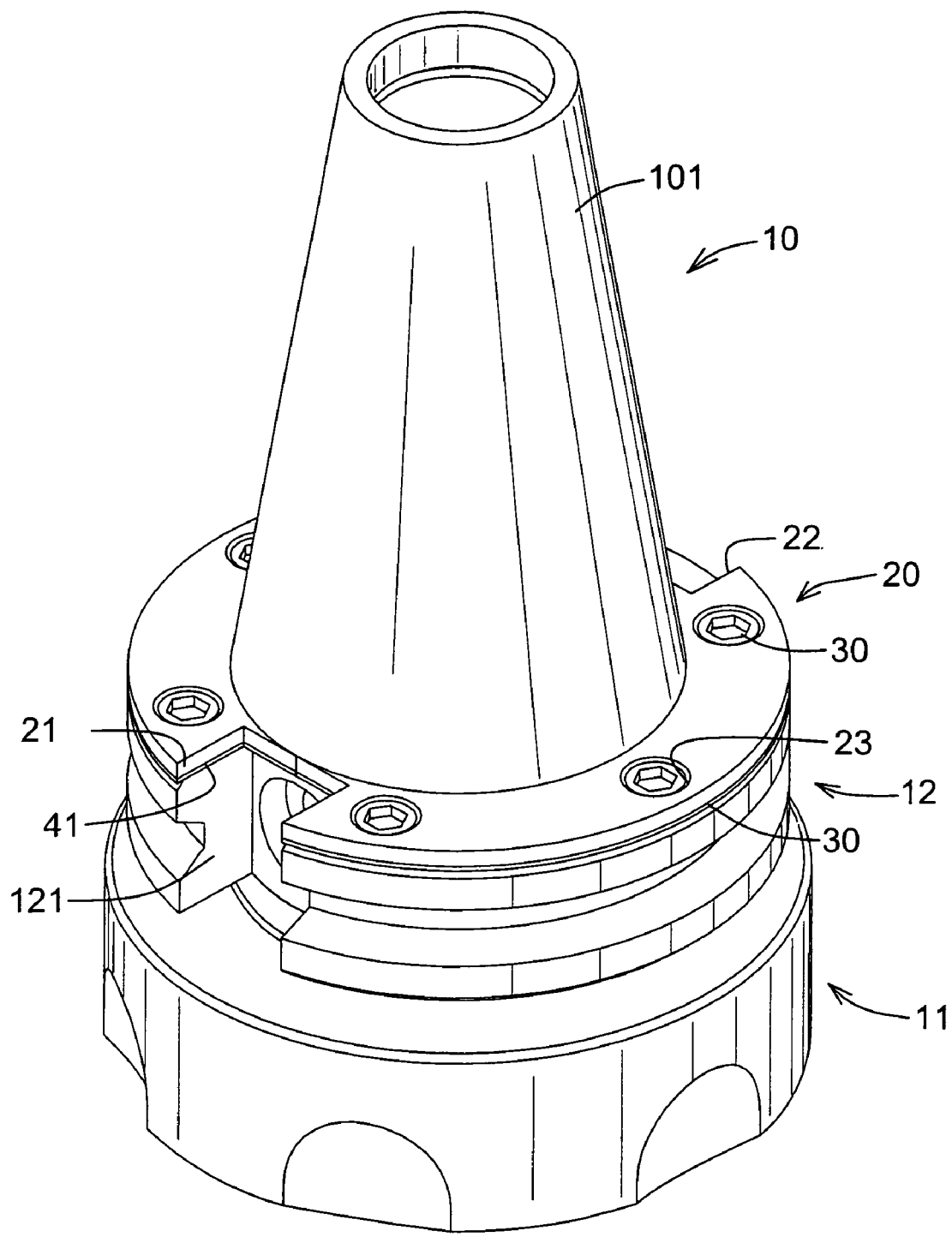
FIG. 7 is a perspective view showing that the annular pad and the secondary annular pad are mounted on and supported by the shoulder of the flange portion of the present invention.

As shown in FIG. 7, it is noted that after the annular pad (20) and the secondary annular pad (40) are mounted on the flange portion (12) via the threaded bolts (30), the combination of the annular pad (20) and the secondary annular pad (40) fills the gap between the bottom face of the processing machine and the chuck (10).

Figure 8:
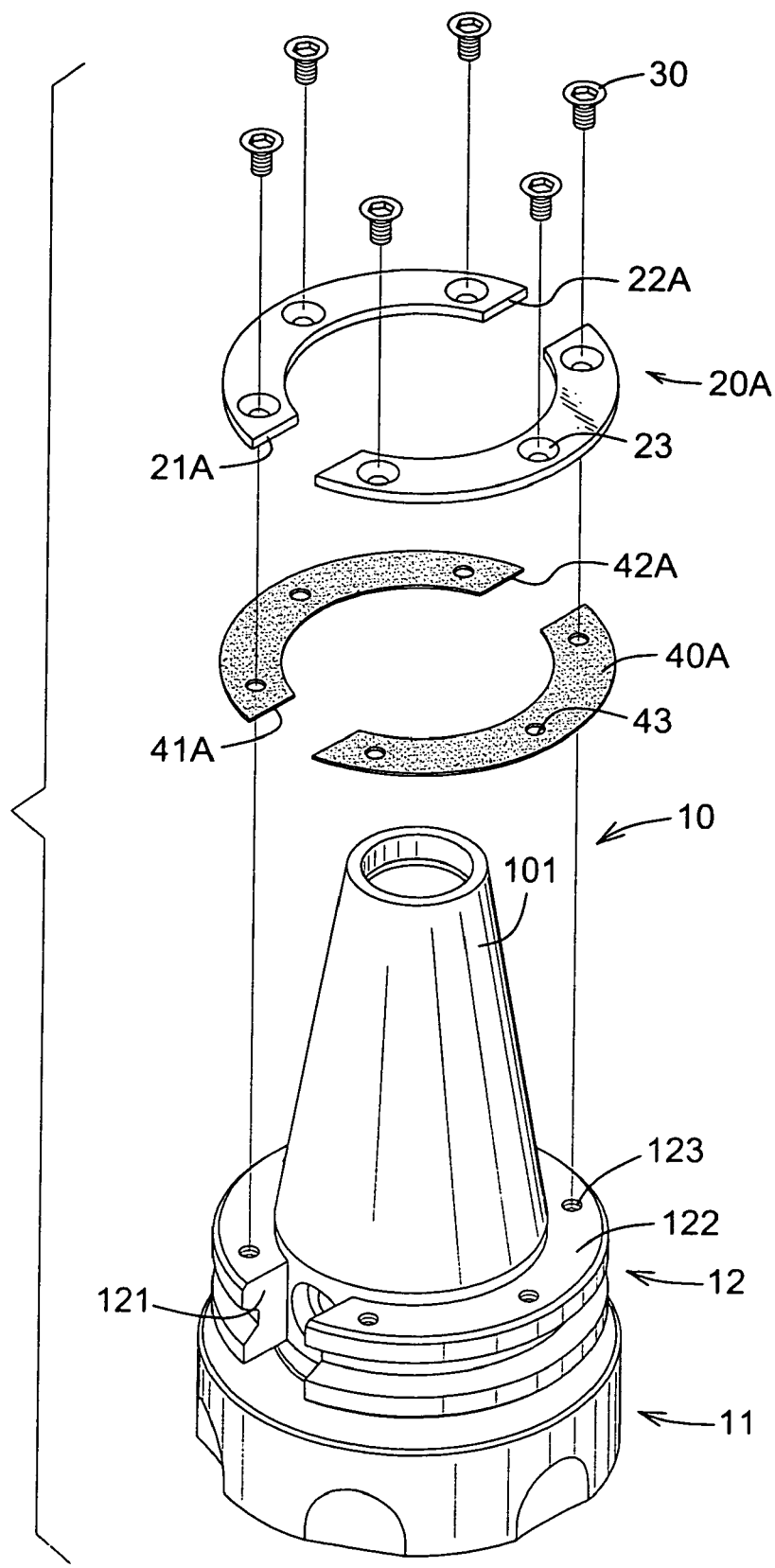
FIG. 8 is an exploded perspective view showing a different embodiment of the annular pad, as well as the secondary annular pad.

With reference to FIG. 8, it is noted that secondary annular pad (40A) may be formed to be sectioned. That is, secondary annular pad (40A) is composed of two halves and can still accomplish the designated objective. To accomplish the configuration of the secondary annular pad (40A), it is noted from the accompanying drawing that the secondary annular pad (40A) now has a third through hole (41A) and a fourth through hole (42A) longitudinally defined in the secondary annular pad (40A) to literally separate the secondary annular pad (40A) into halves to correspond to the halves of the annular pad (20A).

Figure 9:
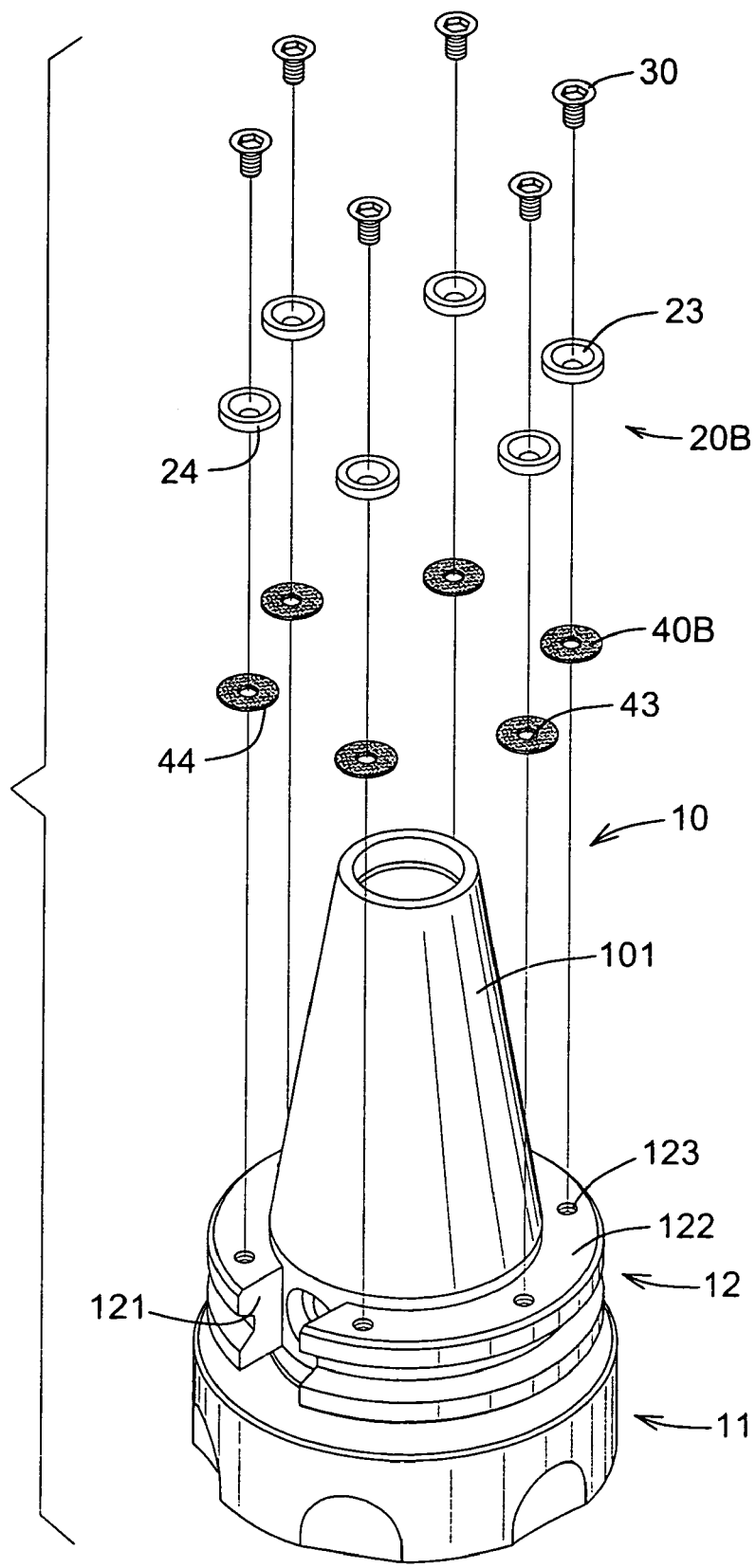
FIG. 9 is an exploded perspective view showing a still different embodiment of the annular pad, as well as the secondary annular pad.
Figure 10:
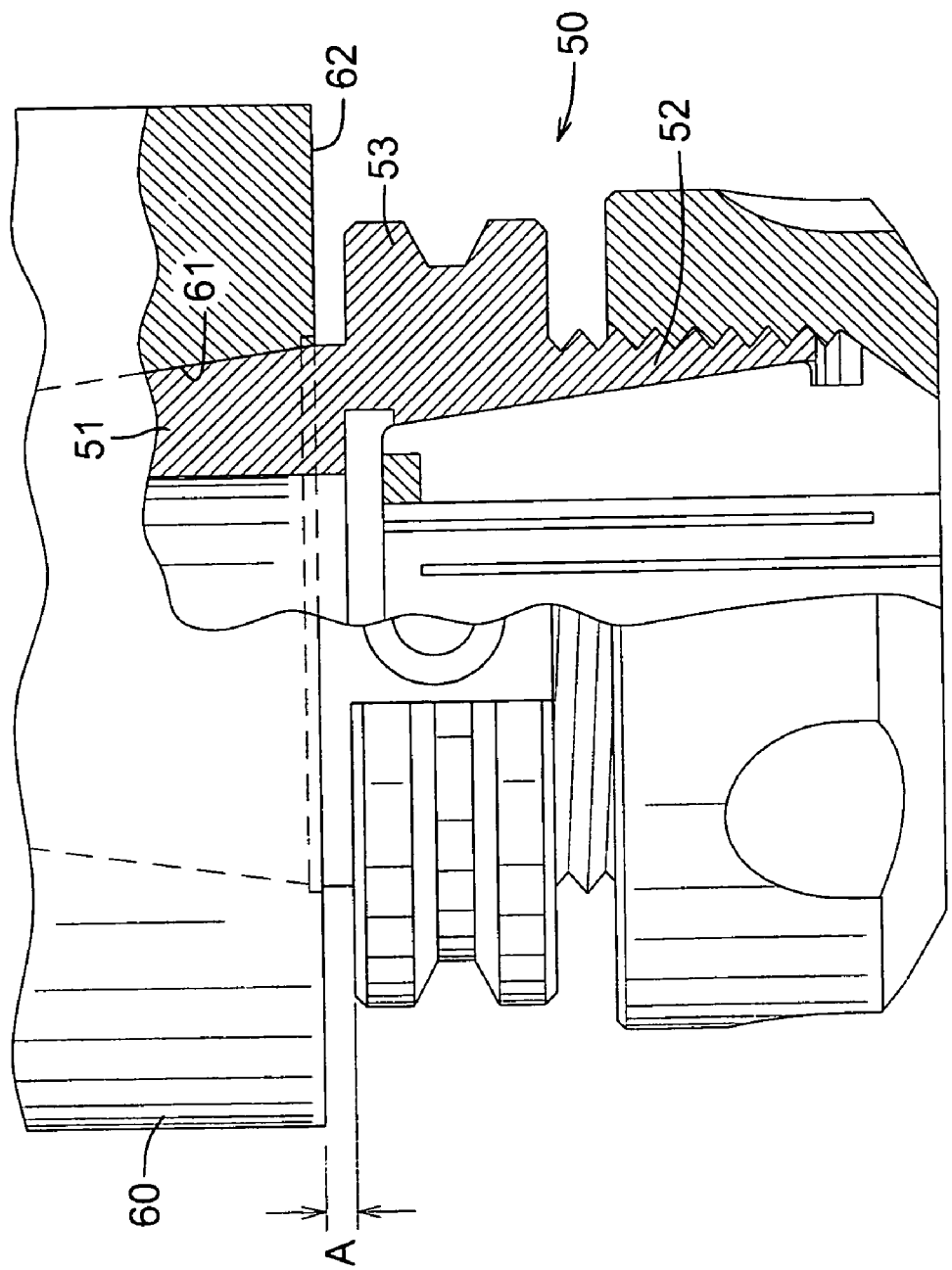
FIG. 10 is a schematic cross sectional view showing a conventional chuck in combination with a processing machine.

With reference to FIG. 9, it is noted that the secondary annular pad (40B) now has six secondary through holes (44) longitudinally defined to literally separate the secondary annular pad (40B) into six sections and can still accomplish the designated objective.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. In a chuck adapted for connection to a processing machine and comprised of a connecting portion adapted to extend into the processing machine so as to securely engage the processing machine, a head adapted for holding a blade, and a flange sandwiched between the head and the connecting portion thereby defining a gap between the flange and a bottom face of the processing machine, the improvement comprising:
a shoulder formed on a top face of the flange portion;
an annular pad supported on the shoulder of the flange portion and adapted to be mounted around the connecting portion; and
a secondary annular pad mounted on and supported by the shoulder of the flange portion, and sandwiched between the shoulder and the annular pad,
whereby a gap between the flange portion and a bottom face of the processing machine is compensated for by existence of the annular pad.

2. The chuck as claimed in claim 1, wherein the shoulder has defined there through multiple threaded holes; wherein the annular pad has defined there through multiple countersunk holes corresponding to the threaded holes of the flange portion; and wherein the secondary annular pad has defined there through multiple apertures corresponding to and aligning with the countersunk holes of the annular pad and the threaded holes of the flange portion so that threaded bolts are able to extend through the countersunk holes of the annular pad, the apertures of the secondary annular pad, and the threaded holes of the flange portion to securely mount the annular pad and the secondary annular pad on top of the shoulder of the flange portion.

3. The chuck as claimed in claim 2, wherein the annular pad is sectioned.

4. The chuck as claimed in claim 3, wherein the annular pad is composed of two halves.

5. The chuck as claimed in claim 3, wherein the annular pad has six through holes longitudinally defined there through to separate the annular pad into six sections.

6. The chuck as claimed in claim 3, wherein the secondary annular pad is sectioned.

7. The chuck as claimed in claim 6, wherein the secondary annular pad is composed of two halves.

8. The chuck as claimed in claim 6, wherein the secondary annular pad has six secondary through holes longitudinally defined there through to separate the secondary annular pad into six sections.

9. The chuck as claimed in claim 4, wherein the secondary annular pad is sectioned.

10. The chuck as claimed in claim 9, wherein the secondary annular pad is composed of two halves.

11. The chuck as claimed in claim 9, wherein the secondary annular pad has six secondary through holes longitudinally defined there through to separate the secondary annular pad into six sections.

12. The chuck as claimed in claim 5, wherein the secondary annular pad is sectioned.

13. The chuck as claimed in claim 12, wherein the secondary annular pad is composed of two halves.

14. The chuck as claimed in claim 12, wherein the secondary annular pad has six secondary through holes longitudinally defined there through to separate the secondary annular pad into six sections.

15. The chuck as claimed in claim 2, wherein the annular pad has defined there through first and second cutouts, and wherein the second cutout is positioned opposite to the first cutout.

16. The chuck as claimed in claim 15, wherein the secondary annular pad is sectioned.

17. The chuck as claimed in claim 16, wherein the secondary annular pad is composed of two halves.

18. The chuck as claimed in claim 16, wherein the secondary annular pad has six secondary through holes longitudinally defined there through to separate the secondary annular pad into six sections.

19. The chuck as claimed in claim 15, wherein the secondary annular pad has defined therein a third cutout which corresponds to the first cutout of the annular pad and a fourth cutout which corresponds to the second cutout of the annular pad.

* * * * *